US006829267B2

(12) United States Patent
Vaughan et al.

(10) Patent No.: US 6,829,267 B2
(45) Date of Patent: Dec. 7, 2004

(54) CONTROL LOOP CIRCUIT AND METHOD THEREFOR

(75) Inventors: Barry John Vaughan, Ipswich (GB); Keith Everett, Bury St Edmunds (GB); Charles Graeme Ritchie, Ipswich (GB)

(73) Assignee: Agilent Technologies Inc., Palo Alto, CA (US)

( * ) Notice: Subject to any disclaimer, the term of this patent is extended or adjusted under 35 U.S.C. 154(b) by 0 days.

(21) Appl. No.: 10/232,374

(22) Filed: Sep. 3, 2002

(65) Prior Publication Data

US 2003/0043439 A1 Mar. 6, 2003

(30) Foreign Application Priority Data

Sep. 3, 2001 (EP) ............................................ 01307490

(51) Int. Cl.[7] .............................................. H01B 3/00
(52) U.S. Cl. ................................ 372/38.02; 372/38.01

(56) References Cited

U.S. PATENT DOCUMENTS

| | | | | | |
|---|---|---|---|---|---|
| 4,501,022 A | * | 2/1985 | Oswald | ...................... | 398/175 |
| 5,153,765 A | * | 10/1992 | Grunziger | ................... | 398/197 |
| 5,402,433 A | * | 3/1995 | Stiscia | ......................... | 372/31 |
| 5,574,709 A | * | 11/1996 | Takeda | ..................... | 369/59.15 |
| 5,646,771 A | * | 7/1997 | Noda | ......................... | 359/245 |
| 5,790,495 A | * | 8/1998 | Kimura et al. | ............ | 369/59.18 |
| 5,974,063 A | | 10/1999 | Yoshida | ........................ | 372/38 |
| 6,108,023 A | * | 8/2000 | Seino | ........................... | 347/236 |
| 6,115,114 A | * | 9/2000 | Berg et al. | .................. | 356/5.13 |
| 6,563,589 B1 | * | 5/2003 | Bennett et al. | .............. | 356/483 |

FOREIGN PATENT DOCUMENTS

EP    0 507 213 A2    10/1992

* cited by examiner

*Primary Examiner*—Don Wong
*Assistant Examiner*—Phillip Nguyen

(57) ABSTRACT

In an optical communications system, it is necessary to control the extinction ratio of a laser device (192) of an optical transmission unit. The laser device (192) is typically used to transmit a signal that can be approximated by a pseudo-random bit stream. The bit stream is monitored by collecting light from a back facet of the laser device (192) using a photodiode (194) in a control loop. Due to band limiting effects of the photodiode (194) and parasitic circuit track capacitances, a feedback signal generated by the photodiode (194) becomes distorted, leading to difficulties in controlling the extinction ratio. The present invention therefore provides an apparatus that simulates a signal generated by the photodiode (194) and subsequent processing of the photodiode signal. The simulated signal and the processed photodiode signal are compared so as to generate a control signal for controlling modulation amplitude of the laser device (192) and hence the extinction ratio.

22 Claims, 2 Drawing Sheets

CONTROL LOOP CIRCUIT AND METHOD THEREFOR

The present invention relates to a control loop circuit apparatus of the type used to compensate modulation amplitude control of a laser device capable of transmitting a broadband signal, for the purpose of controlling an extinction ratio of a semiconductor laser device. The present invention also relates to a method of compensating modulation amplitude control.

In an optical communications network, a semiconductor laser device can be employed in a transmitter for transmission of information to a receiver coupled to the network. When driving the laser device, it is important to be able to control a parameter of the laser device known as the extinction ratio. The extinction ratio is a ratio of a first power level of electromagnetic radiation, for example visible light, emitted by the laser device to communicate a LOGIC 1, to a second power level of light, emitted by the laser device to communicate a LOGIC 0.

A control loop is usually provided comprising a feedback path including, inter alia, a photodiode to receive light emitted from a back facet of the laser device. The photodiode generates an electrical feedback current signal that is used to control modulation amplitude, and hence the extinction ratio, of the laser device. The feedback current signal generated by the photodiode corresponds to the information transmitted, for example a bit stream of data, by the laser device. The frequency of the feedback current signal will depend upon the frequency of the bit stream and the bandwidth of the feedback path. By way of explanation, it should be understood that the frequency of the bit stream transmitted by the laser device will depend upon the bit pattern constituting the data being transmitted. The frequency content of actual data can be approximated by a pseudo-random bit stream and so the data can contain a broad range of frequencies over a period of time. The lowest frequency of the bit stream corresponds to a maximum number of consecutive LOGIC 1s or LOGIC 0s in the data stream, the highest frequency of the data stream corresponding to the actual data rate of the data stream.

When the highest frequency in the data stream is greater than the bandwidth of the feedback path, the current feedback signal becomes distorted. Bandwidth of the photodiode is a major factor that contributes to the bandwidth of the feedback path, but also parasitic circuit track capacitance.

Figure 1:
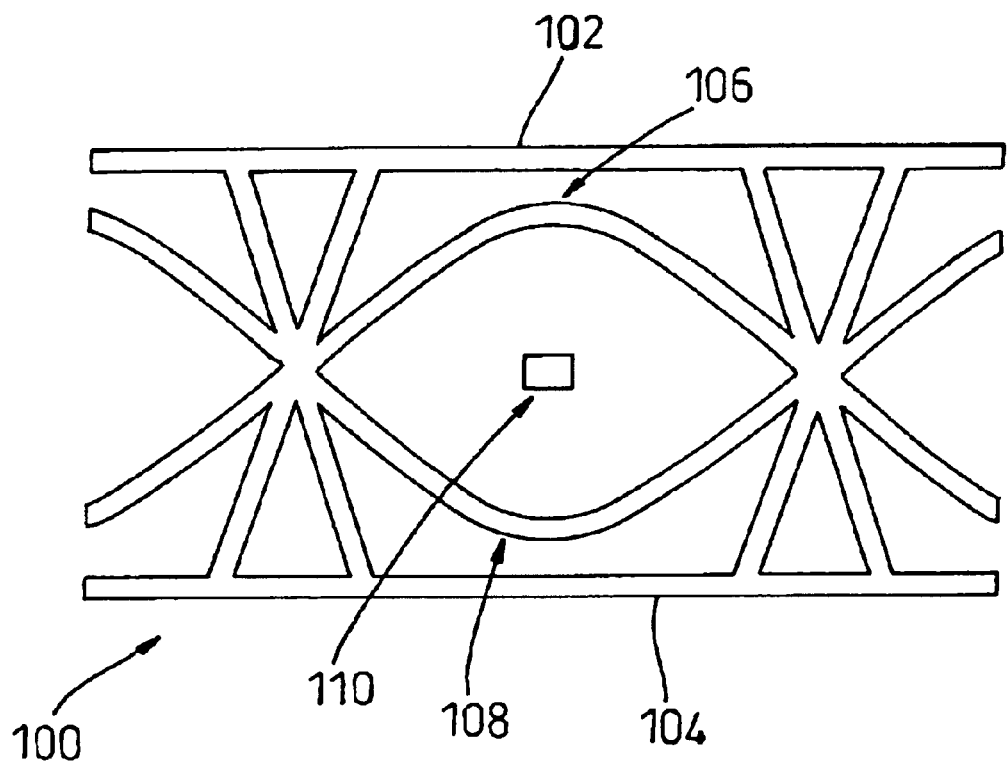

In relation to the speed of the photodiode, the problem caused by slow response of the photodiode can be best understood by reference to an eye diagram. In this respect, FIG. 1 is a schematic representation of an eye diagram 100 of the type generated in a known way using an oscilloscope. The eye diagram 100 comprises a continuous trace of the pseudo-random bit stream plotted with infinite persistence. A maximum level 102 of the trace corresponds to a maximum amplitude reached by the feedback signal as a result of the bit stream comprising a block of a sufficient number of consecutive LOGIC 1s to allow the feedback signal to climb to the maximum amplitude. Similarly, the minimum level 104 of the trace corresponds to a minimum amplitude attained by the feedback signal as a result of the bit stream comprising a block of a sufficient number of consecutive LOGIC 0s to allow the feedback signal to fall to the minimum amplitude. In contrast, a peak 106 of the trace corresponds to a peak amplitude reached by the feedback signal as a result of a first part of the bit stream containing data having a frequency greater than the bandwidth of the feedback path. Similarly, a trough 108 of the trace corresponds to a trough amplitude reached by the feedback signal as a result of a second part of the bit stream containing data having a frequency greater than the bandwidth of the feedback path.

In order to measure a maximum amplitude of the feedback signal, a central zone 110 is identified by the control loop. However, if the peak 106 or the trough 108 of the trace is measured, the measured amplitude will be an incorrect reflection of the actual amplitude of the light received by the photodiode.

Consequently, it is harder to correctly compensate the modulation amplitude of the laser device when the current feedback signal contains data at frequencies above the bandwidth of the feedback path, because the extinction ratio of the laser device may be correct, but the feedback path may not operate sufficiently rapidly to be able to generate the maximum or minimum amplitudes of the current feedback signal when the frequency of the current feedback signal is high. If the extinction ratio of the laser device is incorrectly measured, the modulation amplitude of the laser device will be incorrectly set. This results in an input of the laser device dropping below a lasing threshold corresponding to a LOGIC 0 in response to an input signal corresponding to the LOGIC 0.

Known techniques for setting the modulation power of the laser diode have employed an analogue or digital signal processor using temperature or bias current of the laser device as a reference signal. These techniques are not particularly attractive due to their reliance upon accurate estimates of performance characteristics of the laser device. Another technique involves superimposing a low frequency signal onto an output signal generated by the photodiode. Although this technique eliminates the need for a very high speed feedback loop, the output signal contains noise as a result of the superimposition.

According to a first aspect of the present invention, there is provided a control loop circuit apparatus for compensating modulation amplitude control of a laser device, the apparatus comprising: means for receiving a first signal for transmission to a receiver; means for receiving a second signal generated by a sensor for monitoring the laser device, the second signal corresponding to the first signal; means for simulating signal generation arranged to use the first signal to generate a simulated signal corresponding to the second signal; a processing unit arranged to receive the second signal and the simulated signal, and arranged to generate an output signal for compensating the modulation amplitude control of the laser device, the output signal constituting an indication of a difference between the second signal and the simulated signal.

Preferably, the processing unit comprises a first normalisation unit for adapting the second signal to a predetermined level and/or a predetermined format.

Preferably, the processing unit comprises a second normalisation unit for adapting the simulated signal to the predetermined level and/or predetermined format.

Preferably, the sensor has a frequency band associated therewith, and the means for simulating signal generation comprises a filter having substantially a same frequency band as at least the frequency band of the sensor.

Preferably the means for simulating signal generation comprises a first amplifier.

Preferably, the apparatus further comprising a second amplifier for amplifying the second signal.

Preferably, the processing unit comprises a differential subtractor.

Preferably, the first normalisation unit is a rectifier or a peak detector, and the second normalisation unit is a rectifier or a peak detector.

According to a second aspect of the present invention, there is provided a transmitter circuit for an optical transceiver unit, the circuit comprising the circuit apparatus as set forth above in accordance with the first aspect of the present invention.

According to a third aspect of the present invention, there is provided an optical communications network comprising the circuit apparatus as set forth above in accordance with the first aspect of the present invention.

According to a fourth aspect of the present invention, there is provided a method of compensating modulation amplitude control of a laser device, the method comprising the steps of: receiving a first signal for transmission to a receiver; receiving a second signal generated by a sensor for monitoring the laser device, the second signal corresponding to the first signal; using the first signal to generate a simulated signal corresponding to the second signal; receiving the second signal and the simulated signal, and generating an output signal for compensating the modulation amplitude control of the laser device, the output signal constituting an indication of a difference between the second signal and the simulated signal.

According to a fifth aspect of the present invention, there is provided a control loop circuit apparatus for compensating modulation amplitude control of a laser device, the apparatus comprising: a first input for receiving a first signal for transmission to a receiver; a second input for receiving a second signal generated by a sensor for monitoring the laser device, the second signal corresponding to the first signal; a simulation arrangement for using the first input signal to generate a simulated signal corresponding to the second signal; a processing arrangement for receiving the second signal and the simulated signal, and arranged to generate an output signal for compensating the modulation amplitude control of the laser device, the output signal constituting an indication of a difference between the second signal and the simulated signal.

It is thus possible, by filtering the first signal to the same bandwidth as the sensor, to generate a reference signal that changes in response to the first signal, thereby eliminating false identification of high speed data. It is also possible to provide an apparatus and method that permits accurate control of the modulation amplitude, and hence the extinction ratio, of the laser device, even when the frequency of the second signal is higher than the bandwidth of the feedback path.

At least one embodiment of the invention will now be described, by way of example only, with reference to the accompanying drawing, in which:

FIG. 1, as previously described, is an eye diagram according to the prior art.

Figure 2:
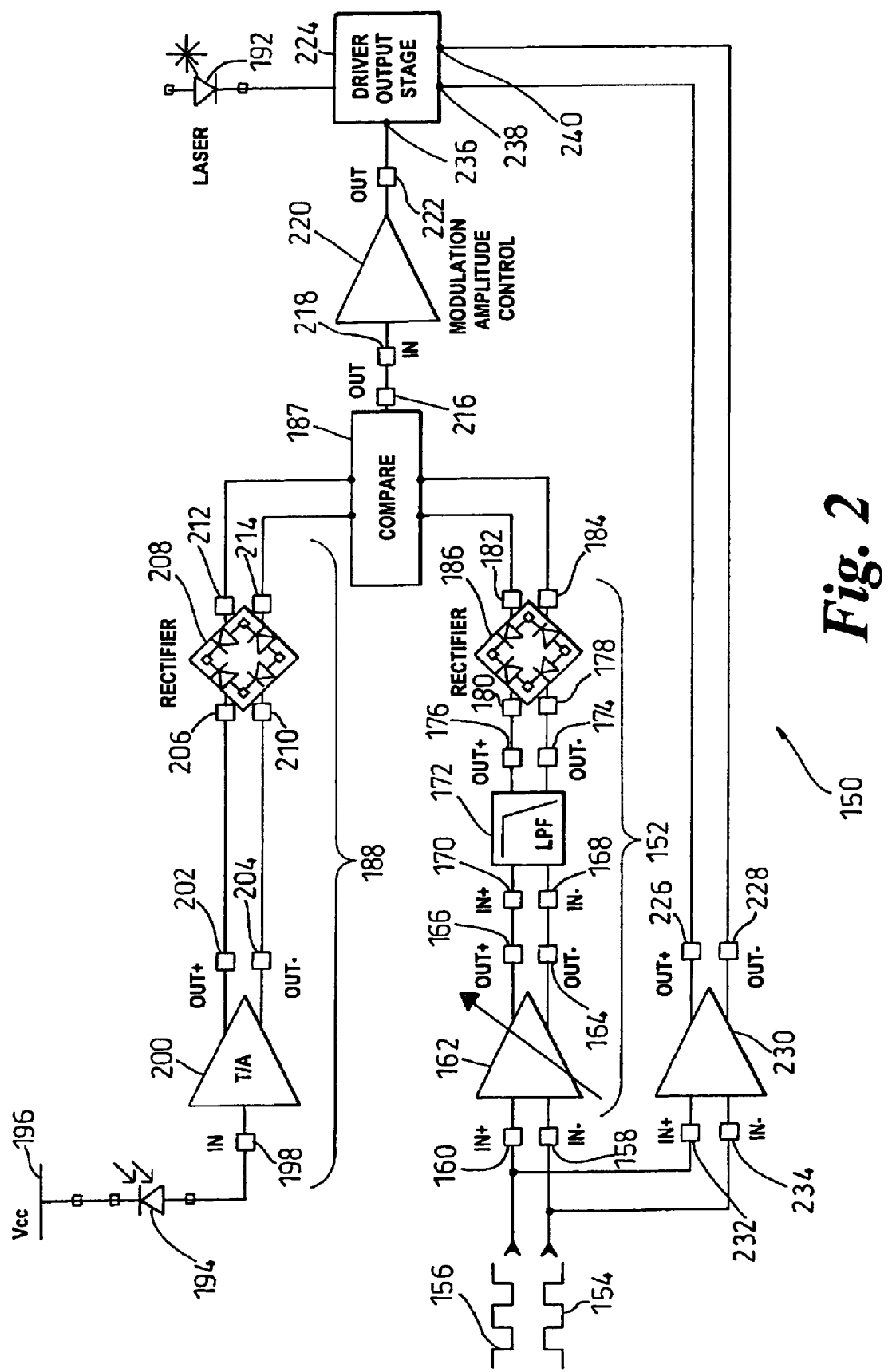

FIG. 2 is a schematic diagram of a control loop circuit apparatus used to compensate the modulation amplitude control of a laser device.

Referring to FIG. 2, a control loop circuit apparatus 150 contains a first circuit branch 152 for processing a first differential data signal comprising an inverted data bit stream 154 and a non-inverted data bit stream 156. The inverted data bit stream 154 and the non-inverted data bit stream 156 are respectively applicable to an inverting input terminal 158 and a non-inverting input terminal 160 of a variable gain differential amplifier 162, the variable gain differential amplifier 162 having an inverting output terminal 164 and a non-inverting output terminal 166. The bandwidth of the variable gain amplifier 162 does not vary with gain.

The inverting output terminal 164 of the variable gain differential amplifier 162 is coupled to a first input terminal 168 of a differential input of a low-pass filter 172, which has a first output terminal 174 of a differential output. The non-inverting output terminal 166 is coupled to a second input terminal 170 of the differential input of the low-pass filter 172, the low-pass filter 172 also having a second output terminal 176 of the differential output. The bandwidth of the low-pass filter 172 is equivalent to the bandwidth of a feedback path (described in more detail infra).

The first output terminal 174 of the low-pass filter 172 is coupled to a first input terminal 178 of a first bridge rectifier 186 and the second output terminal 176 of the low-pass filter 172 is coupled to a second input terminal 180 of the first bridge rectifier 186. A first output terminal 182 and a second output terminal 184 of the first bridge rectifier 186 are coupled to first and second input terminals (not shown) of a comparator 187 which can be, but is not limited to, a differential subtractor.

The circuit apparatus 150 also comprises a second circuit branch 188 for processing signals generated by a photodiode 194. The second circuit branch 188 and the photodiode 194 constitute the feedback path mentioned above. The photodiode 194 is located adjacent a back facet (not shown) of a laser device 192 having a predetermined extinction ratio. A cathode of the photodiode 194 is coupled to a supply rail 196 to receive a first supply voltage of $V_{cc}$ volts, and an anode of the photodiode 194 is coupled to an input terminal 198 of a transimpedance amplifier 200, the transimpedance amplifier 200 having a non-inverting output terminal 202 and an inverting output terminal 204. Alternatively, the cathode of the photodiode 194 can be coupled to the input terminal 198 of the transimpedance amplifier 200 with the anode connected to a supply rail at a sufficient potential to reverse bias the photodiode 194.

The non-inverting output terminal 202 is coupled to a first input terminal 206 of a second bridge rectifier 208, and the inverting output terminal 204 is connected to a second input terminal 210 of the second bridge rectifier 208. The second bridge rectifier 208 also has a first and a second output terminal 212, 214 coupled respectively to a third and a fourth input terminal (not shown) of the comparator 187.

The comparator 187 has an output terminal 216 coupled to an input terminal 218 of a modulation amplitude control circuit 220 for example a transconductance amplifier. The modulation amplitude control circuit 220 has an output terminal 222 coupled to a first input terminal 236 of an output stage 224 of a driver circuit, the output stage 224 of the driver circuit being coupled to a cathode of the laser device 192, an anode of the laser device 192 being coupled to a voltage source sufficient to forward bias the laser device 192, for example the supply rail 196. The output stage circuit 224 also comprises a second input terminal 238 and a third input terminal 240 respectively coupled to a non-inverting output terminal 226 and an inverting output terminal 228 of an amplifier circuit 230, the amplifier 230 having a non-inverting input terminal 232 coupled to the non-inverting input terminal 160 and an inverting input terminal 234 coupled to the inverting input terminal 158 for receipt of the non-inverted and inverted data bit streams 156, 154, respectively. The amplifier circuit 230 comprises pre-amplification and buffering circuitry, for example two differential pair amplifier circuits, the amplifier circuit 230 forming part of the driver circuit.

It should be appreciated that, in the above example, the components/elements described need not be disposed exactly in the order configured above, provided the first bridge rectifier 186 is preceded by the low-pass filter 172 and the first bridge rectifier 186 precedes the comparator 187, unless phase information is retained.

In a second embodiment of the present invention, the above described configuration is modified by replacing the first and second bridge rectifiers 186, 208 with peak detectors.

In operation, the circuit apparatus 150 receives the differential first data signal (in the form of the non-inverted data bit stream 156 and the inverted data bit stream 154) for communication by the laser device 192 as electromagnetic radiation, such as modulated light. The first data signal is amplified by the amplifier circuit 230 and the output stage driver circuit 224 in order to control modulation of the light emitted by the laser device 192.

The photodiode 194 receives the light from the back facet (not shown) of the laser device 192 and generates a second data signal for the purpose of monitoring operation of the laser device 192, for example an extinction ratio of the laser device 192. The second signal generated by the photodiode 194 is amplified by the transimpedance amplifier 200 to produce a first amplified differential signal consisting of a first inverted amplified signal at the inverting output terminal 204 and a first non-inverted amplified signal at the non-inverting output terminal 202. The first amplified differential signal is full wave rectified by the second bridge rectifier 208 to provide a rectified first amplified differential signal. In this embodiment, the second bridge rectifier 208 inverts troughs in the received amplified differential signal so that they become peaks and, although the second bridge rectifier 208 is employed in this embodiment, any type of full wave rectifier is suitable. The rectified first amplified differential signal is output to the comparator 187.

The first circuit branch 152 substantially simultaneously processes the first data signal in order to simulate the bandwidth of the second data signal generated in the feedback path and compare the simulation of the second data signal with the second signal. The non-inverted data bit stream 156 is applied to the non-inverting input terminal 160 of the variable gain amplifier 162 and the inverted data bit stream 154 is applied to the inverting input terminal 158. The variable gain amplifier 162 amplifies the inverted and non-inverted data bit streams 154, 156 to produce a second amplified differential signal consisting of an amplified second inverted signal applied to the first input terminal 168 of the low-pass filter 172, and an amplified second non-inverted signal applied to the second input terminal 170 of the low-pass filter 172. The low pass filter 172 filters the second amplified differential signal so as to simulate the bandwidth of the feedback path. The filtered second amplified differential signal is full wave rectified by the first bridge rectifier 186 to provide a rectified filtered second amplified differential signal constituting a simulation of the rectified first amplified differential signal. Again, in this embodiment, the first bridge rectifier 186 inverts troughs of the filtered second amplified differential signal so that they become peaks and, although the first bridge rectifier 186 is employed in this embodiment, any type of full wave rectifier is suitable.

The filtered second amplified differential signal is output to the comparator 187 and is compared with the rectified first amplified differential signal, in this example, by operation of a differential subtraction in order to yield a signal indicative of a difference, for example an attenuation (positive or negative), between the second data signal generated by the photodiode 194 with the simulation of the second data signal. The signal indicative of the difference corresponds to a degree of band limitation of the light received by the photodiode 194.

Rectifiers 186 and 208, or the peak detector replacements thereof, can be considered normalization units. Normalization units 186 and 208 and comparator 187 form a comparator for the output signal of amplifier 200 indicative of the actual output of laser 192 (as detected by diode 194), with the simulated output of the laser, as derived at the output of low pass filter 172.

When the extinction ratio of the laser device 192 is substantially the same as the predetermined extinction ratio, the comparator 187 generates a difference signal indicating substantially nil difference between the second data signal generated in the feedback path and the simulation of the second data signal. If the extinction ratio of the laser device 192 deviates from the predetermined extinction ratio, a difference will exist between the second data signal and the simulation of the second data signal.

In particular, when the first data signal is high frequency, the frequency of the modulated light generated by the laser device 192 is too fast for the photodiode 194. Hence, the photodiode 194 is unable to generate the second data signal to reflect maximum and/or minimum signal levels of the first data signal. Therefore, without a point of reference, one cannot discern whether or not an attenuation in the second data signal is attributed to deviation of the extinction ratio from the predetermined extinction ratio, or the low bandwidth of the photodiode 194. However, the first circuit branch 152 simulates the second data signal using the first data signal, and so whereas generation of the second data signal by the photodiode 194 is dependent upon electromagnetic energy generated by the laser device 192, the simulation of the second data signal generated in the first circuit branch 152 is dependent upon the first data signal, i.e. the simulation of the second data signal does not comprise perturbations caused by deviation of the extinction ratio of the laser device 192 from the predetermined extinction ratio. Rather, the second data signal comprises attenuations as a result of the, in this case, simulation of the narrow frequency band of the photodiode 194 and excludes any attenuation factors attributable to any deviation in the extinction ratio. Consequently, provided the electromagnetic energy generated by the laser device 192 is unperturbed, for example the extinction ratio of the laser device 192 is substantially equal to the predetermined extinction ratio, the rectified first amplified differential signal is substantially the same as the rectified filtered second amplified differential signal. As soon as the extinction ratio of the laser device 192 deviates from the predetermined extinction ratio, the second data signal (and hence the rectified first amplified differential signal) will differ from the simulation of the second data signal (and hence the rectified second amplified differential signal), thereby signifying that the extinction ratio has changed and providing a correction factor for application to the output stage 224 of the driver circuit.

Consequently, the difference signal corresponding to the differential subtraction carried out by the comparator 186 is amplified by the modulation amplitude control circuit 220 to provide a control signal that is applied to the output stage 224 of the driver circuit. The output stage 224 of the driver circuit uses the control signal to ensure that the extinction ratio of laser device 192 remains substantially at the value of the predetermined extinction ratio.

What is claimed is:

1. A control loop circuit apparatus for compensating modulation amplitude control of a laser device, the apparatus comprising:
    a first receiver for receiving a first signal and outputting the first signal to a laser driver;
    a comparator;
    a second receiver for receiving a second signal generated by a sensor for monitoring the laser device and outputting the second signal to the comparator;

a simulator arrangement for receiving the first signal and simulating the second signal in response to the first signal and outputting the simulated second signal to the comparator;

the comparator being adapted to (a) receive both the second signal and the simulated signal, and (b) generate an output signal for compensating for modulation amplitude control of the laser device, the output signal providing an indication of the relative values of the amplitudes of the second signal and the simulated second signal.

2. An apparatus as claimed in claim 1, further comprising a first normalization unit for adapting the second signal to at least one of a predetermined level and a predetermined frequency band.

3. An apparatus as claimed in claim 2, further comprising a second normalization unit for adapting the simulated signal to the at least one of the predetermined level and predetermined frequency band.

4. An apparatus as claimed in claim 3, wherein the sensor has a frequency band, and the simulator comprises a filter having a frequency band that is substantially at least the same as the frequency band of the sensor.

5. An apparatus as claimed in claim 4, wherein the simulator comprises a first amplifier.

6. An apparatus as claimed in claim 5, further comprising a second amplifier for amplifying the second signal.

7. An apparatus as claimed in claim 6, wherein the comparator comprises a differential subtractor.

8. An apparatus as claimed in claim 3, wherein the first normalization unit comprises a rectifier or a peak detector, and the second normalization unit comprises a rectifier or a peak detector.

9. A method of compensating modulation amplitude control of a laser device, the method comprising the steps of:

receiving a first signal and outputting the first signal to a laser driver;

receiving a second signal generated by a sensor monitoring the laser device;

generating a simulated signal corresponding to the second signal by using the first signal; and generating an output signal that compensates the modulation amplitude control of the laser device by comparing the relative values of the amplitudes of the received second signal and the simulated signal.

10. A control loop circuit apparatus for compensating modulation amplitude control of a laser device, the apparatus comprising:

a first input for receiving a first signal and outputting the first signal to a laser driver;

a comparator;

a second input for receiving a second signal adapted to be generated by a sensor for monitoring the laser device and outputting the second signal to the comparator;

a simulation arrangement for receiving the first signal and simulating the second signal in response to the first signal and outputting the simulated second signal to the comparator, the comparator being adapted to receive both the second signal and the simulated second signal for generating an output signal for compensating the modulation amplitude control of the laser device, the output signal providing an indication of the relative values of the amplitudes of the second signal and the simulated second signal.

11. An apparatus as claimed in claim 1, wherein the comparator comprises a normalization unit for adapting the simulated signal to be at least one of a predetermined level and predetermined frequency band.

12. An apparatus as claimed in claim 1, wherein the sensor has a frequency band, and the simulator comprises a filter having a frequency band that is at least substantially the same as the frequency band of the sensor.

13. An apparatus as claimed in claim 1, wherein the simulator comprises an amplifier.

14. An apparatus as claimed in claim 1, further comprising an amplifier for amplifying the signal.

15. An apparatus as claimed in claim 1, wherein the comparator comprises a differential subtractor.

16. An optical transmitter for a data signal, comprising:

a laser adapted to be responsive to the data signal;

a feedback loop for controlling the laser output, the feedback loop including a sensor for optical energy the laser derives in response to the data signal; and circuitry adapted to be connected to be responsive to the data signal for simulating the response of the feedback loop to the optical energy the laser derives in response to the data signal and for affecting the control the feedback loop provides for the laser output in response to the simulated response of the feedback loop to the optical energy the laser derives in response to the data signal.

17. The apparatus of claim 16 wherein the feedback loop has bandwidth characteristics for the optical energy the laser such that the feedback loop is incapable of accurately following the optical energy the laser derives, and the circuitry includes a filter having substantially the same bandpass characteristics as the feedback loop bandpass characteristics for the optical energy the laser derives.

18. The apparatus of claim 17 wherein the data signal is a bi-level signal for causing the laser to derive bi-level optical energy the sensor being coupled with the laser for causing the bi-level optical energy to activate the sensor to derive a bi-level electrical signal, the feedback loop including a first rectifier connected to be responsive to the bi-level electrical signal derived by the sensor, the circuitry including a second rectifier connected to be responsive to the data signal, the feedback loop including a comparator connected to be responsive to output signals of the first and second rectifiers for deriving a feedback signal for controlling the laser output dependent on the relative values of the magnitude of the outputs of the first and second rectifiers.

19. A method of controlling a laser that emits an optical signal in response to a data signal comprising sensing the optical energy in the optical signal the laser emits in response to the laser being responsive to the data signal, controlling the laser output in response to the sensed optical energy, simulating the response of the control of the laser output in response to the data signal, and modifying the response of the control of the laser output based on the simulation.

20. The method of claim 19 wherein the control has bandwidth characteristics for the optical energy the laser derives such that the control is incapable of accurately following the optical energy the laser derives, and the data signal has substantially the same bandpass characteristics as the control of the laser output in response to the data signal.

21. The apparatus of claim 8 further including the sensor and the laser device, the laser device being connected to be responsive to the comparator, the sensor being optically coupled with the laser connected to the second receiver.

22. The apparatus of claim 1 further including the sensor and the laser device, the laser device being connected to be responsive to the comparator, the sensor being optically coupled with the laser connected to the second receiver.

* * * * *